E. B. NEAL.
ASH SIFTING SHOVEL.
No. 176,881.                        Patented May 2, 1876.
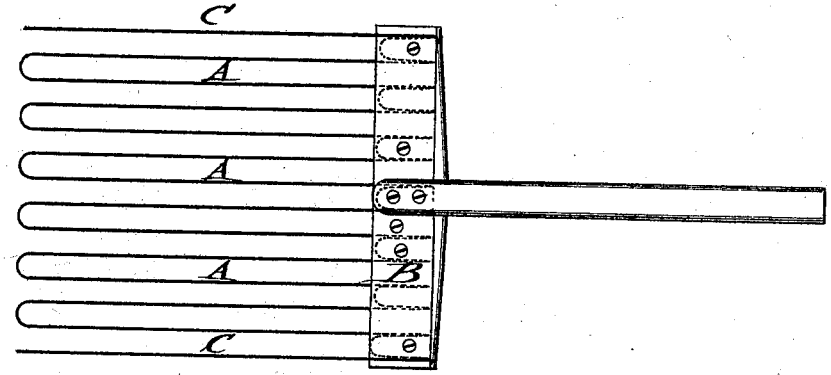
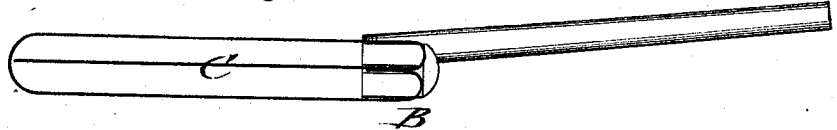
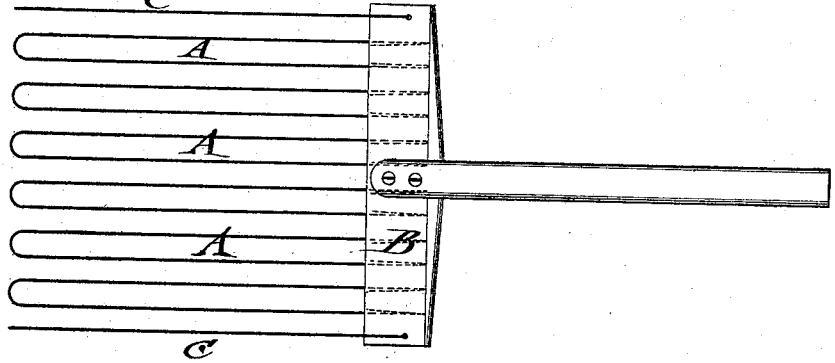
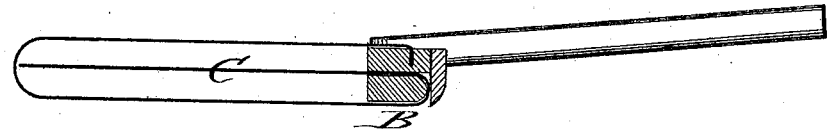

UNITED STATES PATENT OFFICE.

EDWARD B. NEAL, OF WISCASSET, MAINE.

IMPROVEMENT IN ASH-SIFTING SHOVELS.

Specification forming part of Letters Patent No. 176,881, dated May 2, 1876; application filed February 28, 1876.

*To all whom it may concern:*

Be it known that I, EDWARD B. NEAL, of Wiscasset, in the county of Lincoln and State of Maine, have invented a new and Improved Ash-Sifting Shovel, of which the following is a specification:

In the accompanying drawing, Figures 1 and 3 represent top views, and Figs. 2 and 4 side views, of my improved ash-sifting shovel.

Similar letters of reference indicate corresponding parts.

The object of my invention is to provide an improved shovel for sifting the ashes of furnaces, cooking and other stoves without the annoying and penetrating dust that is raised by the common ash-sifters; and the invention consists of shovel with wire tines and side guards applied to a fastening-head and handles.

In the drawing, A represents the wire tines of my ash-sifting shovel, which are made double by bending two tines of one length of wire and connecting them at the outer end, by which each tine is stiffened and supported by the other, as shown in Figs. 3 and 4; or the wire tines may be made of one continuous piece of wire, which is bent to form the connected tines, the entire piece being secured between a head, B, of two pieces with fastening-batten, as shown in Figs. 1 and 2. The batten is of wood or metal, attached to the rear end of the head, to prevent the wire tines from working loose. The tines may be made straight or dishing lengthwise, so that the coal may be more readily retained in it while the ashes are being shaken out. The shovel is provided with side tines or guards C, that are attached to the head either separately or bent in one piece with the tines.

The shovel is used by taking up the ashes on it, and shaking the same while they are yet under the grate, the ashes falling through, while the coal remains on the tines and is thrown into the feed-door above. The coal is thereby saved without annoyance whatever, as the draft prevents the ashes from entering into the cellar or room.

Having thus described my invention, what I claim as new, and desire to secure by Letters Patent, is—

An ash-sifting shovel having the tines in pairs, connected by a bend at the outer end, the sides returning parallel, and the points fitted directly into a wooden head, as shown and described.

EDWARD B. NEAL.

Witnesses:
 WILDER F. MCCLINTOCK,
 S. W. GREENLEAF.